(12) United States Patent
Braford, Jr.

(10) Patent No.: US 6,227,340 B1
(45) Date of Patent: May 8, 2001

(54) AUTOMATIC TRANSMISSION WITH DUAL GAIN MULTI-DISK FRICTION DEVICE

(75) Inventor: Thomas E. Braford, Jr., Brighton, MI (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/379,404

(22) Filed: Aug. 24, 1999

(51) Int. Cl.⁷ .................................................. F16D 21/08
(52) U.S. Cl. ........................ 192/48.7; 192/48.3; 192/48.1; 192/85 AA; 192/70.28
(58) Field of Search ................................ 192/48.3, 48.7, 192/48.1, 85 C, 85 CA, 70.27, 87.1, 87.11, 85 AA, 52.2, 70.28

(56) References Cited

U.S. PATENT DOCUMENTS

| | | |
|---|---|---|
| 2,633,712 | 4/1953 | Sheppard . |
| 3,004,390 | 10/1961 | Duffy . |
| 3,693,800 | 9/1972 | Stanfield . |
| 4,391,354 * | 7/1983 | Bucksch ............... 188/71.5 |
| 4,934,502 * | 6/1990 | Horsch .............. 192/85 AA |
| 5,234,087 | 8/1993 | Jürgens . |
| 5,305,863 | 4/1994 | Gooch . |
| 5,469,943 | 11/1995 | Hill . |
| 5,480,014 * | 1/1996 | Barton et al. ............ 192/48.3 |

* cited by examiner

Primary Examiner—Charles A. Marmor
Assistant Examiner—Tisha D. Waddell
(74) Attorney, Agent, or Firm—Reising, Ethington, Barnes, Kisselle et al.; Greg Dziegielewski

(57) ABSTRACT

A fluid pressure operated friction coupling comprising a multiple friction disc assembly having a single piston actuator and having first and second springs operatively configured and arranged in response to pressurization of the piston actuator to selectively engage first and second sets plates and friction components for varying the gain of the coupling.

16 Claims, 2 Drawing Sheets

AUTOMATIC TRANSMISSION WITH DUAL GAIN MULTI-DISK FRICTION DEVICE

BACKGROUND OF THE INVENTION

1. Field of the Invention

The present invention relates to friction devices such as clutch or brake assemblies for use in transmissions, differentials or brake systems and more particularly to such devices having a piston actuated clutch or brake pack including separator plates and friction discs.

2. Description of the Prior Art

The transmission mechanism described here includes a hydrokinetic torque converter having a bladed impeller driven by an internal combustion engine for an automotive vehicle. The converter includes also a bladed turbine and a bladed stator situated in toroidal fluid flow relationship with respect to the impeller. The turbine is connected to torque input elements of a multi-speed ratio planetary gear system. The output portion of the gear system is connected to a transmission tailshaft, which in turn is connected to the vehicle traction wheels through a driveshaft and differential-and-axle assembly.

The reaction element for the gear system is adapted to be anchored by the improved friction disc coupling of the present invention. Such braking action is useful in for holding a component of a gear set during a particular gear range. In certain applications it is know to employ several multi-disc pack friction devices in combination to establish different drive connections throughout the transmission or differential to provide various gear ratios in operation or to brake a component.

In certain prior art mechanisms the engagement of an underdrive speed ratio band brake is accompanied by an undesirable harshness due to the sudden application of friction braking torque. Attempts have been made to cushion the engagement of the friction brake bands in environments of this type, one arrangement being shown in Duffy U.S. Pat. No. 3,004,390 and another arrangement is shown in U.S. Pat. No. 2,633,712. U.S. Pat. No. 3,693,800 sets forth a cushioning action in a friction disc brake, as distinguished from a band brake, and it provides an accumulator action following initial cushioned engagement of the friction discs as the mechanism is conditioned for underdrive operation. The cushioning action that occurs during initial braking engagement provides a reduced or modified torque capacity. This is followed by stroking of the main piston portion of the mechanism. As an accumulating action takes place, the portion of the compound piston structure that establishes the initial braking engagement cooperates with the main piston portion to define a common working chamber. As the main piston portion moves with respect to the smaller piston portion, an accumulator action takes place because of the compression of a piston spring acting on the main piston portion.

After the main piston portion moves relative to the smaller piston portion to its limiting position, the brake servo pressure rises to its maximum value, thereby establishing full braking action. At that instant motion of the reaction element relative to the stationary transmission housing will approach zero angular velocity.

Timing orifices may be formed in the main piston portion. The size of the orifices, as well as the characteristics of the spring acting on the main piston portion, may be varied to suit particular design characteristics.

While suitable for their intended purpose, such arrangements fail to provide an easily assembled friction disc coupling that can be accommodated in a limited radial space between a torque converter and a transmission for a front wheel drive vehicle.

SUMMARY OF THE INVENTION

Accordingly, an object of the present invention is to provide a transmission including a friction coupling that has a variable torque gain including first and second sets of separate plates and friction discs that are selectively applied in accordance with a dual spring arrangement one of the springs interposed between a single friction disc coupling operating piston and the first set of separate plates and friction discs and the other of the springs being interposed between the first and second sets of separate plates and friction discs and wherein the pressure acting on the single friction disc coupling piston determines when the first and second sets of separate plates and friction discs are applied to change the friction coupling gain changes.

A further object of the invention is to locate such a friction coupling in a rotating housing to control the friction coupling gain between a torque transfer input and output of a automatic transmission and wherein the friction coupling is operative to apply a variable torque transfer in accordance with the pressure applied to the single friction coupling operating piston.

A still further object of the invention is to provide such a friction disc coupling with externally splined plates connected to a fixed housing and with internally splined friction discs connected to a planetary gear set so as to provide speed changes within an automatic transmission.

A still further feature is to provide a compact dual gain friction coupling in a transmission that is suitable for use in a limited radial space between a torque converter and a transmission of a front wheel drive vehicle.

Yet another feature is to provide such a compact dual gain friction coupling wherein the springs are reduced width disc type springs and the plates and friction discs are reduced width components that reduce the radial dimension of a multi-speed transmission.

Yet another feature is to provide such devices wherein the first spring has an inside diameter engaged to the piston; a snap ring connected to the housing and the first spring having an outside diameter engaged with the snap ring and wherein the first spring when relaxed positioning the piston out of engagement with the first set of separate plates and friction discs.

Still another feature is to provide such devices wherein the second spring has an inside diameter engaged to a separator plate in the first set of separate plates and friction discs; a second snap ring connected to the housing and the second spring having an outside diameter engaged with the snap ring and wherein the second spring when relaxed releasing the second set of separate plates and friction discs.

BRIEF DESCRIPTION OF THE DRAWINGS

Other advantages of the invention will be readily appreciated, as the same becomes better understood by reference to the following detailed description when considered in connection with the accompanying drawings wherein.

DETAILED DESCRIPTION OF A PREFERRED EMBODIMENT

Figure 1:
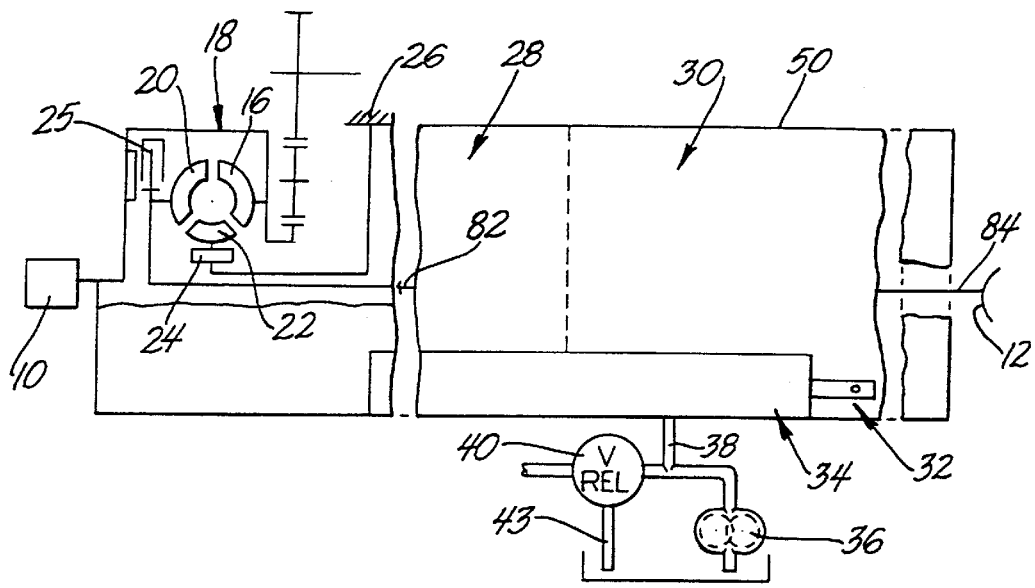
FIG. 1 is a diagrammatic view of a multi-speed hydraulic power transmission of the type suitable for use with the present invention.

Numeral 10 designates a prime mover such as an internal combustion engine in an automotive vehicle driveline. Numeral 12 designates the vehicle traction wheels, which are connected through a suitable differential-and-axle mechanism to a driveshaft, which is connected in turn to the driven shaft 14 of the transmission. The crankshaft of engine 10 is connected to impeller 16 of hydrokinetic torque converter 18. Impeller 16 includes a shell, which encloses the bladed members of the converter, the latter comprising impeller 16, turbine 20 and stator 22. The bladed converter members are arranged in toroidal fluid flow relationship in the usual fashion. Stator 22 is a dapted to rotate in the direction of rotation of the impeller, but it is braked against rotation in the opposite direction by overrunning brake 24 supported by stationary stator sleeve shaft 26.

The torque converter includes a lock-up clutch 25 that is selectively controlled during speed changes to be disengaged whereby the torque converter absorbs shock as the prime mover 10 directs torque through the transmission. Such operation of the torque converter occurs at relatively low speed and under relatively high torque operation.

The transmission includes an input clutch assembly 28 and a speed change assembly 30. For purposes of understanding the present invention it is understood that such assemblies include a number of friction devices that are selectively actuated in a known manner for establishing a desired speed ratio and/or direction of drive for the transmission.

Each of the friction devices are selectively operated in accordance with a transmission controller 32 that is either manually or electronically controlled to selectively direct hydraulic fluid to operating pistons for the friction devices in a known manner. As shown schematically in FIG. 1 one such control can include a transmission control valve 34 and fluid is directed under pressure thereto from a pump 36 through a conduit 38. Fluid pressure within the conduit 38 is regulated by a relief valve 40 that is operative to return excess fluid to a drain or sump 42 through a conduit 43.

Figure 2:
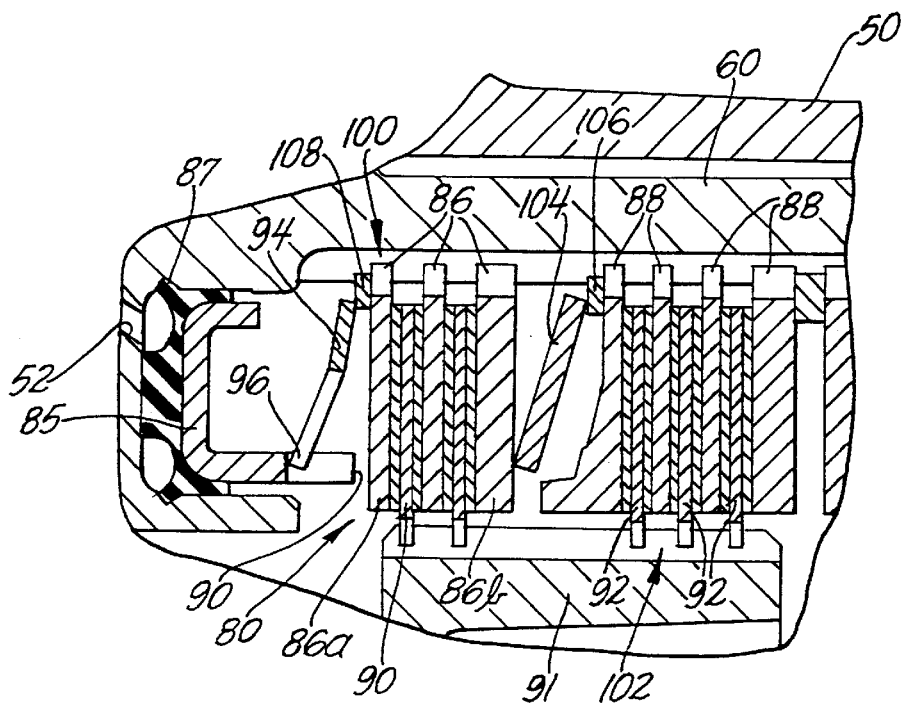
FIG. 2 is an enlarged, fragmentary sectional view of a dual gain friction disc coupling in the present invention.
Figure 3:
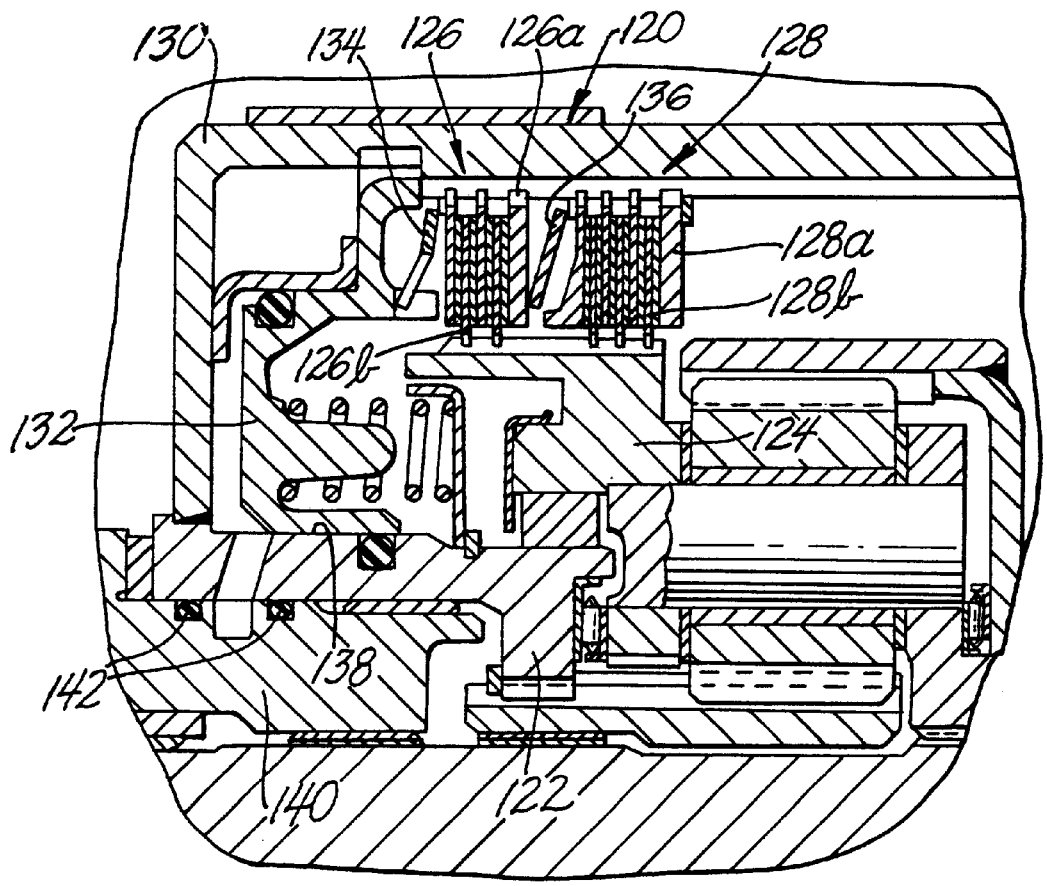
FIG. 3 is a fragmentary sectional view of another embodiment of the invention.

The speed change assembly 30 is incorporated within an outer casing 50, a portion of which is shown in FIG. 2, that has a reduced dimension or profile in the radial direction due in part to the inclusion therein of a grounded housing 60 therein that incorporates a low profile friction coupling 80 of the present invention that includes features that apply a dual gain so that as the pressure operating the coupling 80 increases, the coupling 80 has an increased torque transfer and wherein the change of braking torque is gradual for smoothing the speed changes through the planetary gear sets of a speed change assembly 30 details of which are well known to those skilled in the art and that do not need to be set-forth herein for an understanding of the present invention.

The friction coupling 80 of the present invention controls the flow of torque through known gear sets to control the flow of torque from an input 82 to an output 84 by braking components of a gear set within the speed change section 30.

The friction coupling 80 as will be described in one embodiment is a dual gain friction coupling having multiple sets of separator plates and friction discs shown within the speed change section of the transmission as a braking application. However, if desired, such dual gain features can be included in any environment wherein dual gain friction couplings are used including such friction devices employed in connection with a transmission (either as a brake or a clutch) differentials or brake systems.

In the present invention the brake 80 is housed in grounded housing 60 that constitutes a fixed brake housing 60. A single hydraulically actuated piston 85 is supported within a bore 87 within the housing 60. The piston 85 is supplied with pressurized fluid through a passage 52 connected to the conduit 38 through the control valve 34. The brake 80 includes a first plurality of externally splined plates 86 and a second plurality of externally splined plates 88 that are anchored by the housing 60. The plates 86 cooperate with a first plurality of internally splined friction discs 90 that are connected to a gear set component 91 and the discs 88 cooperate with a second plurality of internally splined friction discs 92 also connected to the gear set component 91. In accordance with the invention, the single operating piston 85 engages a first spring 94 that has a spring force that will hold the piston 85 at a shoulder 96 thereon in its retracted position within a cylinder bore 87 within the housing 60. The first spring 94 positions an annular segment 98 on the piston 85 out of engagement with one of the plates 86 when the brake is released. In this embodiment the plates and discs 86, 90 define a first set 100 of plates and friction elements that are initially released and the plates and discs 88, 92 constitute a second set of plates and friction elements 102 that are initially released. Interposed between the first and second sets 100, 102 of plates and friction elements is a second spring 104 that when relaxed has its inside diameter contacting an inboard one 86b of the plates 86 and its outside diameter contacts a snap ring 106 anchored to the housing 60. The first spring 94 likewise has its outside diameter engaged with a snap ring 108 anchored to the housing 60. Thus, as shown the sets 100, 102 are comprised of reduced width components with a radial width substantially the same as that of the springs associated therewith.

In operation the first and second sets of plates and friction elements 100, 102 are normally released and the gear set component 91 is free to rotate thus allowing a first torque flow in the transmission. On application of a first pressure buildup in the cylinder bore 87 as shown at line 110 in FIG. 4, the braking torque will increase at a first rate until the resistance of the spring 94 is overcome at which point the annular segment 98 of the piston 85 will move against the outboard plate 86a causing the engagement between the first set of discs 100 to increase to a level represented by the point 112 on the line 110. At this point, the pressure within the cylinder bore 87 is sufficient to cause the inboard plate 86b to overcome the resistance of the spring 104 to force the inside diameter of the spring 104 against the second set of plates and friction discs 102 to produce a second gain of braking torque greater shown by the line 114 in FIG. 4 that has a slope greater than that of line 110 and hence a greater braking torque for a predetermined increment of pressure increase in the cylinder bore 87.

The springs 94, 104 can be circular wave springs or Belleville springs to be accommodated within limited axial confines of the illustrated embodiment. However, other forms of springs can be utilized within the inventive concept so long as they operate to provide a dual gain action wherein a sequential operation of a first set of friction elements is operative to institute engagement of a second set of friction elements so as to produce the desired dual gain output from either a brake, clutch or other device employing such hydraulically actuated friction elements.

Figure 4:
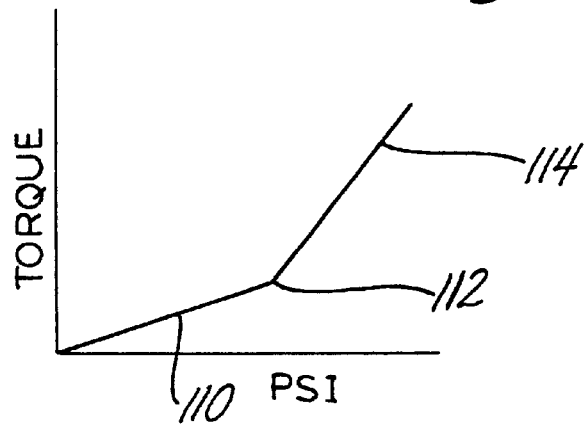
FIG. 4 is a graph of the operating characteristics of a friction coupling including the present invention.

The embodiment of the invention shown in FIG. 4 is a dual gain clutch 120 interposed between an input 122 and an output 124. The clutch 120 has a first set of separate plates and friction disc 126 and a second set of separate plates and friction discs 128 both housed within a rotating housing 130. A piston 132 actuates a first spring 134 to control application of the first set of discs 126 until the applied torque (psi) is great enough to overcome the greater spring force of a second spring 136 that is connected between the sets 126, 128. Each of the sets has externally splined plates 126*a*, 128*a* connected to rotating housing 130 and they have internally splined friction discs 126*b*, 128*b* connected to the output 124. Actuation pressure to the piston cylinder 138 is supplied through a stationary member 140 sealed with respect to the rotating housing 130 by suitable seals 142.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

What is claimed is:

1. A hydraulically operated device having coupling packs operatively connected with a single hydraulic piston for varying the torque transfer between two points in power transmission characterized by the coupling packs including first and second sets of friction components; a first spring interposed between the piston and the first set of friction components and a second spring interposed between the first set of friction components and said second set of friction components; said second spring having a greater spring force than said first spring and operative when said first set of friction components are engaged by said piston to overcome the force of said second spring whereby said first set of friction components are initially engaged and then said second set of friction components are engaged so as to provide a dual friction disc coupling gain and wherein the first friction disc coupling gain has a slope dependent upon the spring rate of the first spring and the second friction disc coupling gain has a slope dependent upon the spring rate of the second spring.

2. The hydraulically operated device of claim 1 further including said first set of friction components have a plurality of externally splined plates that are configured to be connected to a housing and said first friction components having a plurality of internally splined friction discs that are configured to be connected to a torque transfer component of a transmission and wherein said second friction components have a plurality of externally splined plates that are configured to be connected to said housing and second friction components having a plurality of internally splined friction discs that are configured to be connected to said torque transfer component.

3. The hydraulically operated device of claim 1, a fixed housing, a gear set component, said first friction components have a plurality of externally splined plates that are configured to be connected to said fixed housing and first friction components having a plurality of internally splined friction discs that are configured to be connected to said gear set component and wherein said second friction components have a plurality of externally splined plates that are configured to be connected to said fixed housing and said second friction components having a plurality of internally splined friction discs that are configured to be connected to said gear set component.

4. The hydraulically operated device of claim 1 a rotating housing, said first friction components have a plurality of externally splined plates that are configured to be connected to said rotating housing and said first friction components having a plurality of internally splined friction discs that are configured to be connected to a torque transfer component of a transmission and wherein said second friction components have a plurality of externally splined plates that are configured to be connected to said rotating housing and said second friction components having a plurality of internally splined friction discs that are configured to be connected to said torque transfer component.

5. The hydraulically operated device of claim 1 wherein said first and second springs are reduced width disc springs.

6. The hydraulically operated device of claim 2 wherein said first and second springs are reduced width disc springs.

7. The hydraulically operated device of claim 3 wherein said first and second springs are reduced width disc springs.

8. The hydraulically operated device of claim 4 wherein said first and second springs are reduced width disc springs.

9. The hydraulically operated device of claim 5 wherein said first spring has an inside diameter engaged to said piston; a snap ring connected to said housing and said first spring having an outside diameter engaged with said snap ring and wherein said first spring when relaxed positioning said piston out of engagement with said first set of friction components.

10. The hydraulically operated device of claim 6 wherein said first spring has an inside diameter engaged to said piston; a snap ring connected to said housing and said first spring having an outside diameter engaged with said snap ring and wherein said first spring when relaxed positioning said piston out of engagement with said first set of friction components.

11. The hydraulically operated device of claim 7 wherein said first spring has an inside diameter engaged to said piston; a snap ring connected to said housing and said first spring having an outside diameter engaged with said snap ring and wherein said first spring when relaxed positioning said piston out of engagement with said first set of friction components.

12. The hydraulically operated device of claim 8 wherein said first spring has an inside diameter engaged to said piston; a snap ring connected to said housing and said first spring having an outside diameter engaged with said snap ring and wherein said first spring when relaxed positioning said piston out of engagement with said first set of friction components.

13. The hydraulically operated device of claim 9 wherein said second spring has an inside diameter engaged to one of said first set of friction components; a second snap ring connected to said housing and said second spring having an outside diameter engaged with said snap ring and wherein said second spring when relaxed releasing said second set of friction components.

14. The hydraulically operated device of claim 10 wherein said second spring has an inside diameter engaged to one of said first set of friction components; a second snap ring connected to said housing and said second spring having an outside diameter engaged with said snap ring and wherein said second spring when relaxed releasing said second set of friction components.

15. The hydraulically operated device of claim 11 wherein said second spring has an inside diameter engaged to one of said first set of friction components; a second snap ring connected to said housing and said second spring having an outside diameter engaged with said snap ring and wherein said second spring when relaxed releasing said second set of friction components.

16. The hydraulically operated device of claim 12 wherein said second spring has an inside diameter engaged to one of said first set of friction components; a second snap ring connected to said housing and said second spring having an outside diameter engaged with said snap ring and wherein said second spring when relaxed releasing said second set of friction components.

* * * * *